United States Patent [19]

Fukagawa et al.

[11] Patent Number: 5,210,840
[45] Date of Patent: May 11, 1993

[54] ADDRESS SPACE CONTROL APPARATUS FOR VIRTUAL MEMORY SYSTEMS

[75] Inventors: Masakazu Fukagawa; Yasuhiko Hatakeyama, both of Hadano; Toshiyuki Kinoshita, Sagamihara; Toshiaki Arai, Kawasaki, all of Japan

[73] Assignee: Hitachi, Ltd., Tokyo, Japan

[21] Appl. No.: 412,504

[22] Filed: Sep. 26, 1989

[30] Foreign Application Priority Data

Sep. 28, 1988 [JP] Japan ............................... 63-240854

[51] Int. Cl.⁵ ...................... G06F 12/00; G06F 12/06; G06F 12/08; G06F 12/10
[52] U.S. Cl. ................................ 395/400; 364/DIG. 1
[58] Field of Search ... 364/200 MS File, 900 MS File; 395/400

[56] References Cited

U.S. PATENT DOCUMENTS

| | | | |
|---|---|---|---|
| 4,355,355 | 10/1982 | Butwell et al. | 364/200 |
| 4,521,846 | 6/1985 | Scalzi et al. | 364/200 |
| 4,654,777 | 3/1987 | Nakamura | 364/200 |
| 4,979,098 | 12/1990 | Baum et al. | 364/200 |
| 4,992,936 | 2/1991 | Katada et al. | 364/200 |
| 5,008,811 | 4/1991 | Scalzi et al. | 364/200 |
| 5,023,777 | 6/1991 | Sawamoto | 364/200 |

OTHER PUBLICATIONS

Electronics Engineers' Handbook, second edition, Donald G. Fink and Donald Christiansen, McGraw-Hill Book Company, 1982, pp. 23-23 and 23-24.

Primary Examiner—Joseph L. Dixon
Assistant Examiner—Michael A. Whitfield
Attorney, Agent, or Firm—Fay, Sharpe, Beall, Fagan, Minnich & McKee

[57] ABSTRACT

In a disclosed embodiment of the address space control apparatus, each general-purpose register usable as a base register is associated with another general-purpose register in addition to an access register containing a segment table origin. When a general-purpose register is selected as a base register, the contents of its associated general-purpose register are read out and added to the segment table origin from the associated access register to provide an effective segment table origin. In a modification, the access registers are omitted, and the general-purpose register selected as a base register are used to select an entry in a register or register array containing segment table origins in respective entries. In other embodiments disclosed, general-purpose registers are used in different manners to enhance virtual address space control functions.

8 Claims, 6 Drawing Sheets

ADDRESS SPACE CONTROL APPARATUS FOR VIRTUAL MEMORY SYSTEMS

BACKGROUND OF THE INVENTION

The present invention relates to an address space control apparatus for virtual memory systems and, more particularly, to an address space control apparatus for controlling multiple virtual address spaces suitable for handling very large quantities of data.

U.S. Pat. No. 4,355,355 entitled "Address Generating Mechanism for Multiple Virtual Spaces" by J. R. Butwell et al. discloses a multiple virtual memory system which enables a program to have access to multiple virtual address spaces. In that system, each general-purpose register (GR) is associated with an access register (AR) containing a segment table origin (STO). Each STO locates a segment table for address translation, thereby defining one address space. When a GR is designated as a base register (BR) by an instruction, the contents of the AR associated with that GR are read out to provide an STO. A special, non-priviliged instruction is also provided to change the contents of each AR. This instruction loads a designated AR with data in a main storage area defined by the contents of a control register.

Thus, by changing the contents of an AR or by designating a different GR as a BR, a program can make use of multiple STO's, hence of multiple address spaces.

This system has provided a definite improvement to virtual memory systems in that a program can gain access to multiple address spaces. For example, a collection of data too bulky to be accommodated by a single address space can be easily handled by this system.

However, the above-described system is not without its share of room for further improvement. Where address spaces are to be switched, the system requires changing the contents of an AR, or designating a different BR, as described above. To change the AR contents requires gaining access to main memory. In turn, gaining access to main memory involves translation from logical to real addresses. It takes time to carry out these operations. In particular, when it is necessary to switch address spaces frequently, there occurs a marked drop in processing speed.

Meanwhile, designating different BR's poses no such challenges. Instead, however, each instruction is required to designate an appropriate GR as a BR. This requirement may present extra burdens when the result of a preceding operation determines the address space to be accessed, or when address spaces are to be switched halfway through repeated processing. For example, there may arise a need to switch address spaces while a subroutine is being executed repeatedly on successive portions of data in large quantities. In such a case, each BR-designating field must be rewritten in all or numerous selected instructions within the subroutine. In addition, the number of address spaces that are accessible under this method can not exceed the number of GR's that may be used as BR's. To use further address spaces requires changing the contents of AR's as described above.

SUMMARY OF THE INVENTION

It is an object of the present invention to provide a flexible mechanism for easily handling large quantities of data by neither changing the contents of AR's nor designating different BR's.

In is a further object of the present invention to provide a flexible mechanism which enables a program to have access readily to multiple address spaces.

It is another object of the present invention to provide a means for directly controlling the switching of address spaces through indexing.

It is an additional object of the present invention to provide a means that allows a program to select desired partial spaces easily in wider address spaces, whereby providing the program with very extensive available address spaces.

It is another object of the present invention to provide a combination of the above-described features with such an address space switching mechanism as disclosed in the above-mentioned U.S. Pat. No. 4,355,355 involving the selection of BR's, thereby implementing more flexible address space control.

In a first embodiment of the present invention, each GR that can be used as a BR is associated with another GR. The contents of the latter GR participate in the designation of an address space. More specifically, there are provided a first component information register that contains first component information for determining an address space; a circuit for reading second component information for determining an address space from a GR associated with a GR designated as a BR; and a circuit for determining an address space identifier (e.g., STO) to be combined with a logical address through the use of the first and second component information. In one example, the first component information is an address space identifier that serves as a base to which is added the second component information as a displacement. In another example, the first component information is an address space identifier contained in each of multiple entries in a register arrangement, and the second component information is an entry designator that designates a specific entry in the register arrangement. In the latter example, there may be additionally provided an entry designator register that retains an entry designator that serves as a base, which may be added to the second component information to specify an entry.

The first embodiment enables a program to access different address spaces by changing, incrementing or decrementing the contents of a GR associated with another GR designated as a BR. The contents of the GR can be changed, incremented or decremented as desired using ordinary register operation instructions. This makes it possible to switch address spaces more flexibly than if the contents of AR's are replaced or different BR's are designated.

In a second embodiment of the present invention, a GR designated by an instruction as an index register is coupled with another GR associated with the former GR to form a double-length index register. An address space identifier given by an address identifier register is coupled with the contents of another GR designated as a BR to form a double-length base address whose high-order part is occupied by the address space identifier. The double-length base address and the double-length index data from the above-described double-length index register are input to an address adder. The low-order half of the output from the address adder is used as a logical address; the high-order half is used as an address space identifier to be combined with the logical address.

In the second embodiment, the high-order part of index data is used directly as an address space displacement, while an overflow from the logical address is handled as an increment of the address space identifier value. In this manner, indexing-based gradual changes in the address effect automatically the switching of address spaces.

In a third embodiment of the present invention, the address space identifier register is supplemented by a shifter that shifts left the contents of a GR designated as a BR before inputting the GR contents to the address adder, and a shift-length register that designates the length of the shift to be performed by that shifter.

In the third embodiment, although the number of address spaces that can be accessed remains unchanged, the size of each address space that can be accessed is expanded. By changing, incrementing or decrementing the contents of a GR used as a BR, it is possible to switch designated partial spaces in this vast address space.

The above-described embodiments may be combined in the following manner with an address space switching mechanism that operates in response to the selection of a GR as a BR: Each of the GR's that can be used as a BR is associated with its own first component information register and/or entry designator register in the first embodiment; with its own address space identifier register in the second embodiment; or with its own address space identifier register and shift length register in the third embodiment. When a given GR is selected as a BR, the respective registers that are associated with that GR are also selected. In this manner, more flexible control over address spaces is made available.

According to the present invention, the use of GR's whose contents can be freely and readily changed for control over address spaces makes it possible to switch or expand the address spaces with high degrees of ease and freedom. In particular, it becomes much easier to gain consecutive access to very large quantities of data. As a result, it becomes easier to write programs for performing scientific and engineering calculations, data base processing, or the like involving huge data arrays. Another benefit is an increase in the speed at which such programs are processed.

DETAILED DESCRIPTION OF THE PREFERRED EMBODIMENTS

Figure 1:
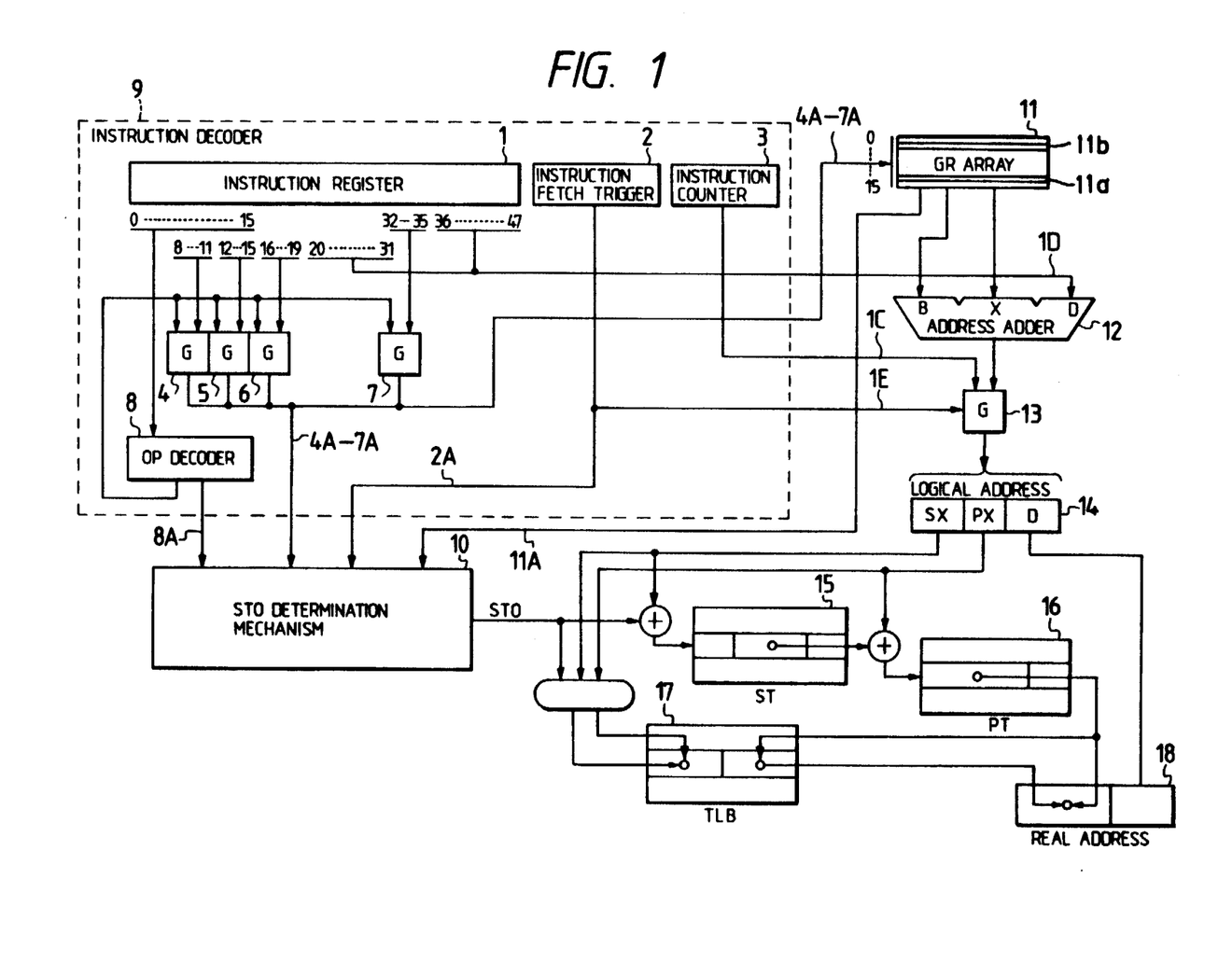
FIG. 1 is a schematic diagram of an address translation system that incorporates an embodiment of an address space control apparatus according to the present invention.

FIG. 1 schematically illustrates an address translation system that incorporates an embodiment of the present invention. This figure resembles FIG. 1 of U.S. Pat. No. 4,355,355 except that a data line 11A, to be described later, is added. The address translation system comprises an instruction decoder 9, an STO determination mechanism 10, a circuit (including elements 10 through 13) for producing a logical address in a logical address register 14, and an address translation mechanism (including elements 15 through 17) for translating the logical address into a real address in a real address register 18.

The instruction decoder 9 contains an instruction register 1, an instruction fetch trigger 2 for indicating an instruction fetch cycle, an instruction counter 3, gates 4 through 7, and an OP decoder 8 for decoding the operation code of each instruction. The gates 4 through 7 select GR designation fields of an instruction according to its operation code. Outputs 4A through 7A from the gates designate appropriate GR's in a GR array 11 as an operand register, a BR and an index register (XR). The contents of the GR selected as the BR, the contents of the GR selected as the XR, and a displacement (D) field ID of the instruction are added by an address adder 12 to form a logical address. A gate 13 is controlled by the instruction fetch trigger 2 so that it selects the output of the instruction counter 3 during an instruction fetch cycle, or the output of the address adder 12 during periods other than the instruction fetch cycle. The output of the gate 13 is set into the logical address register 14.

A logical address, exclusive of a sign bit, is composed of an 11-bit segment index (SX) part for designating a segment; an 8-bit page index (PX) part for designating a page in the segment; and a 12-bit displacement (D) part for specifying a displacement in the page. A two Gigawords address space is provided by use of the logical address thus structured. The SX designates one of the entries in a segment table (ST) 15 located by the STO coming from the STO determination mechanism 10. The PX designates one of the entries in a page table (PT) 16 pointed to by the ST entry designated. In turn, the designated PT entry designates a location of a page frame in main memory. That location is combined with the D part of the logical address to form a real address. In addition, the page frame location thus obtained, along with the STO, SX and PX which have been used therefor, is entered into a conventional translation lookaside buffer (TLB) 17 to provide for subsequent designation of the same page.

The STO determination mechanism 10 is supplied with a branch target instruction fetch signal 8A produced when the OP decoder 8 decodes a branch instruction code; with an output 2A of the instruction fetch trigger 2; and with a BR designating signal from among the outputs 4A through 7A of the gates 4 through 7. Furthermore, according to the present invention, each of the GR's 11a that can be used as a BR is associated with another GR, while the contents 11A of the GR 11b associated with the GR selected as the BR by the gate outputs 4A through 7A are fed to the STO determination mechanism 10. For example, odd-numbered GR's may be defined as GR's that can be used as a BR each, while each odd-numbered GR is associated with the immediately preceding even-numbered GR. This association may be implemented by selecting a GR using the BR address with its least significant bit being changed to '0'.

Figure 2:
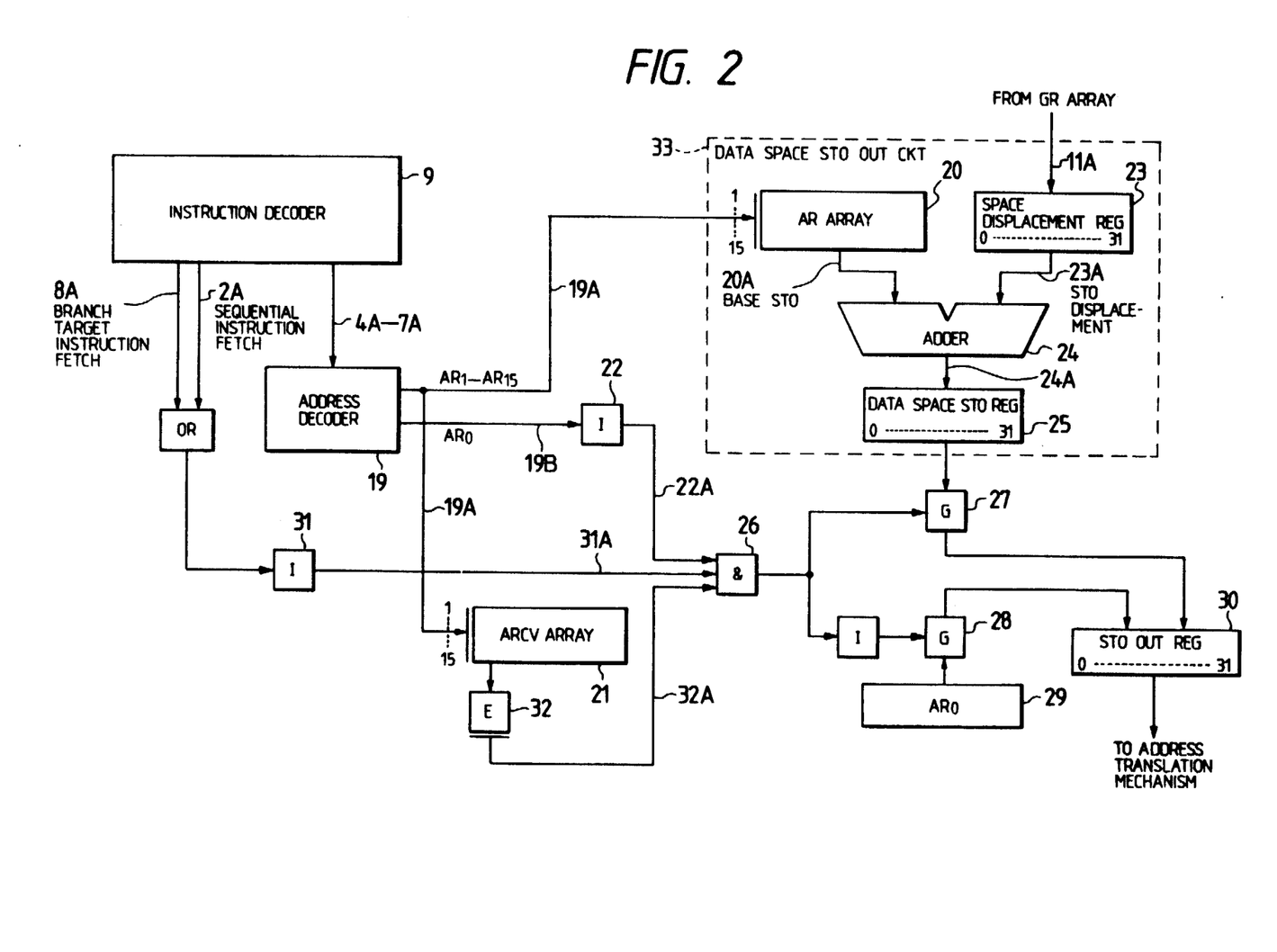
FIG. 2 is a diagram showing an embodiment of an STO determination mechanism in the system shown in FIG. 1.

FIG. 2 is a detailed view of the STO determination mechanism. This figure resembles FIG. 2 of U.S. Pat.

No. 4,355,355 except that the portions having no direct relevance to the present invention are omitted and that a circuit for modifying the AR output is added as per the present invention. Each AR in an AR array 20, together with every ARCVR (AR control vector register) in an ARCV array 21, is associated with each GR that can be used as a BR. Each AR contains one STO. Each ARCVR contains an E bit 32 indicating whether or not access is allowed to the address space defined by the STO in the AR that pairs with the current ARCVR, and other access control information. That one of the outputs 4A through 7A of the gates 4 through 7 which is used for selecting a BR is also applied to an address decoder 19 in the STO determination mechanism. A selection signal 19A for $AR_1$ through $AR_{15}$ is fed to the AR array 20 and ARCV array 21, where the signal selects the AR and ARCVR which correspond to the GR designated by the instruction as the BR.

The contents 11A of the GR that is associated with the GR designated as a BR are retained temporarily in a space displacement register 23. Contents 23A (STO displacement) of the register 23 and an STO (base STO) 20A in the selected AR are added by an adder 24. The sum is placed in a data space STO register 25. Gates 27 and 28 select the contents either of the data space STO register 25 or of an $AR_0$ 29, and transfer the selected contents to an STO out register 30. The $AR_0$ 29 contains the STO corresponding to the address space wherein is resident the currently running program.

The selection of register contents by the gates 27 and 28 is controlled by an AND circuit 26. The AND circuit 26 receives: an inverse 31A of an OR combination of the branch target instruction fetch signal 8A from the instruction decoder 9 and the sequential instruction fetch signal 2A; an inverse 22A of an $AR_0$ selection signal 19B from the address decoder 19; and an E bit signal 32A from the selected ARCVR. As a result, during periods other than the instruction fetch cycle, if the $AR_0$ is not selected and access is permitted to the address space corresponding to the STO derived from the contents of the selected AR, the AND circuit 26 selects the data space STO register 25 via the gate 27; in other cases, the AND circuit 26 selects the $AR_0$ 29 via the gate 28. The contents of the STO out register 30 are sent to the address translation mechanism (TLB, ST, PT) depicted in FIG. 1, in which they are used as an STO address after being shifted left by the bit positions corresponding to the ST size.

In this embodiment, a different address space is accessed by merely changing the contents of a GR associated with a GR used as a BR. For example, it is possible to access successive address spaces by incrementing the contents of the associated GR by '1' at a time.

Figures 3, 4:
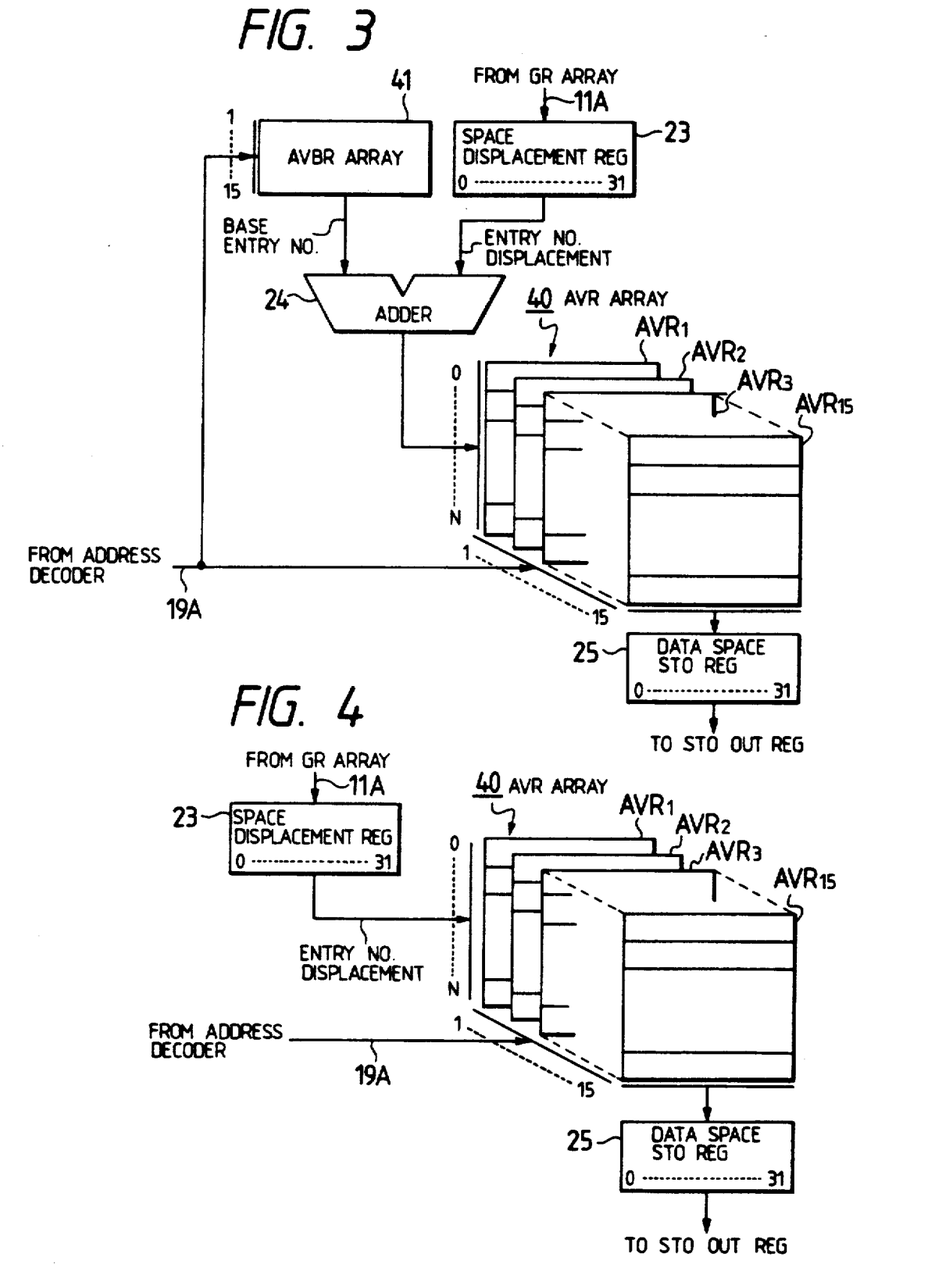
FIG. 3 is a view showing a modification to the embodiment in FIG. 2.
FIG. 4 is a view showing another modification to the embodiment in FIG. 2.

FIG. 3 shows a modification to a data space STO out circuit 33. In place of the AR array 20 in FIG. 2, an address vector register (AVR) array 40 is provided. Each AVR has multiple entries, and each entry contains one STO. Further, there is provided an access vector base register (AVBR) array 41 comprising AVBR's associated respectively with the AVR's. Each AVBR contains a base entry number for selecting an entry in the AVR associated with that AVBR. The contents of the space displacement register 23, e.g., the output of a GR associated with a GR designated as a BR, is used as an entry number displacement. The contents of each AVR and AVBR, as well as the AR contents, may be replaced with other data retrieved from main memory through the use of a special instruction.

The selection signal 19A from the address decoder 19 selects an AVR and an AVBR associated with that AVR. The base entry number from the selected AVBR and the entry number displacement from the space displacement register 23 are added by the adder 24. The sum is used to specify one of the entries in the AVR selected by the selection signal 19A. The STO contained in the entry designated in this manner is read into the data space STO register 25.

FIG. 4 depicts another modification, in fact a simplified version of the mechanism in FIG. 3. In this modification, the AVBR array 41 and adder 24 shown in FIG. 3 are omitted. The contents of the space displacement register 23 specify an entry number directly.

Figure 5:
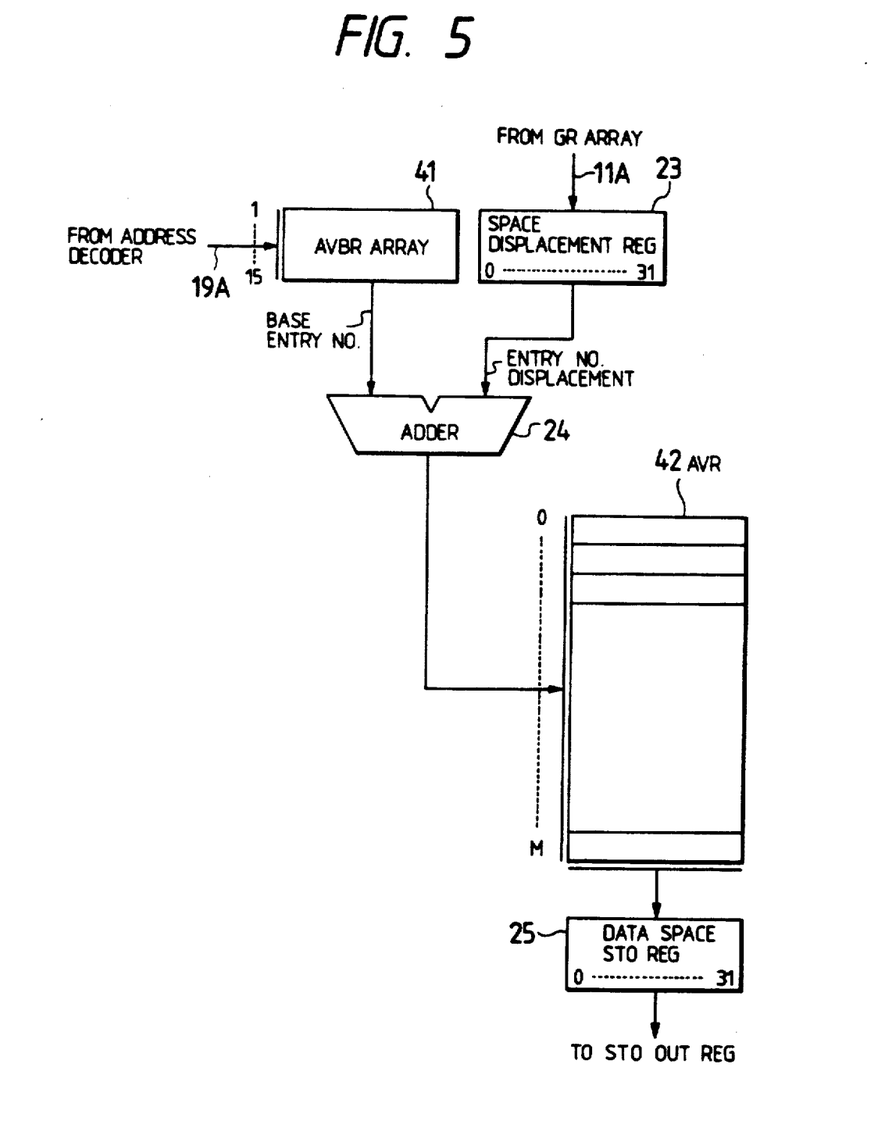
FIG. 5 is a view showing a further modification to the embodiment in FIG. 2.

FIG. 5 shows a further modification to the mechanism illustrated in FIG. 3. In place of the AVR array 40 in FIG. 3, there is provided a single, large-size AVR 42 having numerous entries identified by consecutive entry numbers. Each of the AVBR's in the AVBR array 41 may designate any entry in the AVR 42. The selection signal 19A is supplied to the AVBR array 41 alone. The contents of the space displacement register 23 provide a displacement between the entry designated by the selected AVBR and the entry to be finally selected.

Figure 6:
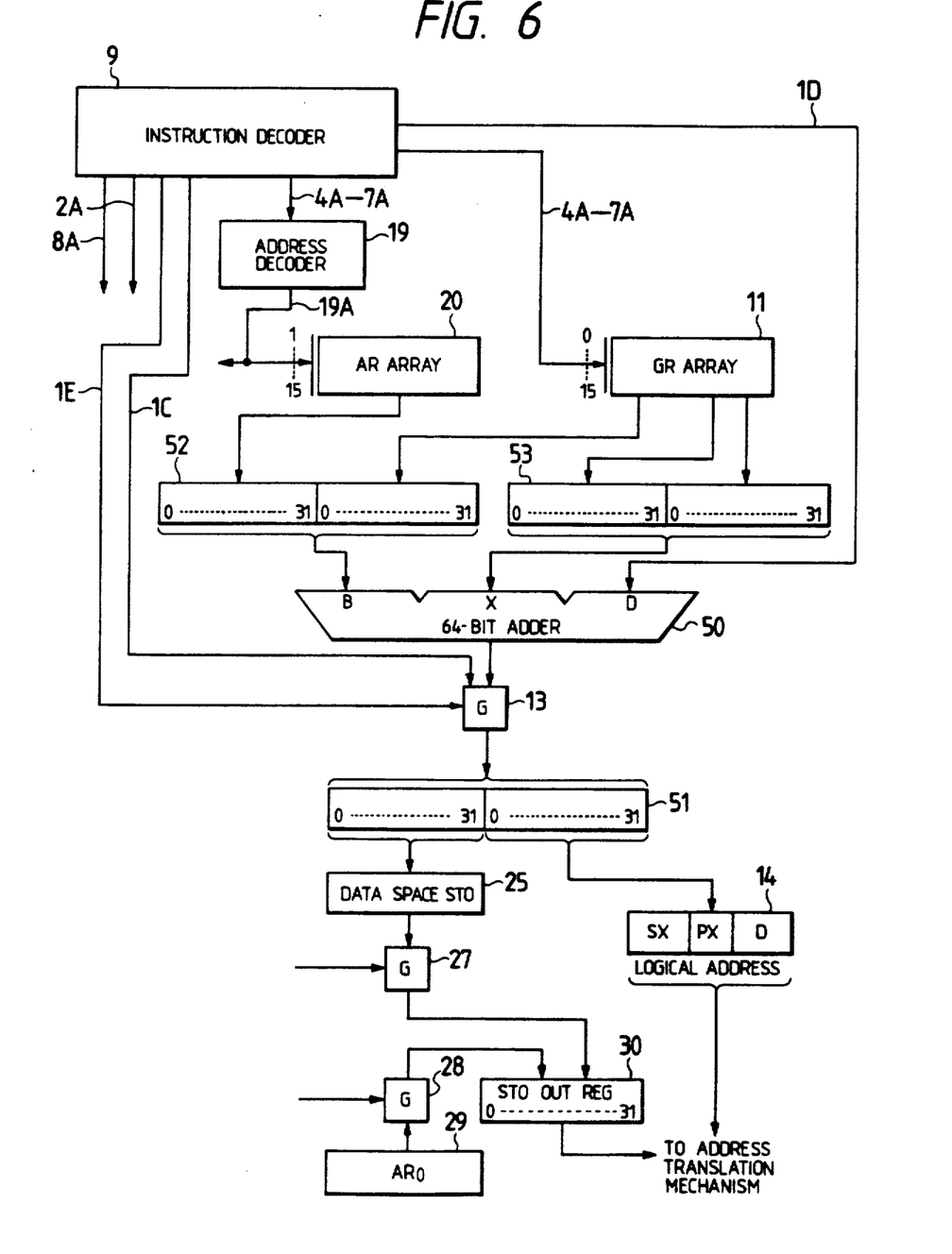
FIG. 6 is a view showing a further embodiment of the present invention.

FIG. 6 shows another embodiment of an address space control apparatus according to the present invention. In this embodiment, two GR's, e.g., an odd-numbered GR designated by an instruction and the immediately preceding even-numbered GR, are serially coupled to form a 64-bit-long index register 53. In addition, the contents of a GR designated as a BR and the STO from the associated AR in the AR array 20 constitute a 64-bit base address 52 whose high-order part is the STO. The base address 52, index data 53 from the above-mentioned 64-bit index register, and a displacement ID from the instruction are added by a 64-bit-wide address adder 50. If the sum is selected by the gate 13, then 64-bit-long address data 51 is produced. The low-order 32 bits of the data 51 are placed in the logical address register 14, from where they are supplied as a logical address to the address translation mechanism. Meanwhile, the high-order 32 bits of the data 51 are placed in the data space STO register 25. If selected by the gate 27, these high-order 32 bits are supplied via the STO out register 30 to the address translation mechanism. The control circuit for the gates 27 and 28 is the same as that in FIG. 2 and is therefore not shown in this figure.

In this address calculation mechanism, the value of the high-order 32 bits in index data directly indicates an STO displacment. In addition, an overflow from the low-order 32 bits during address calculation is treated as an increment of the STO displacement. Therefore, as the logical address changes gradually through indexing, address spaces are automatically switched. There is no need to insert in advance instructions to change GR contents for switching address spaces, as in the mechanisms in FIGS. 1 through 5. Thus this mechanism is suitable for handling consecutively a huge data array spanning multiple address spaces.

Figure 7:
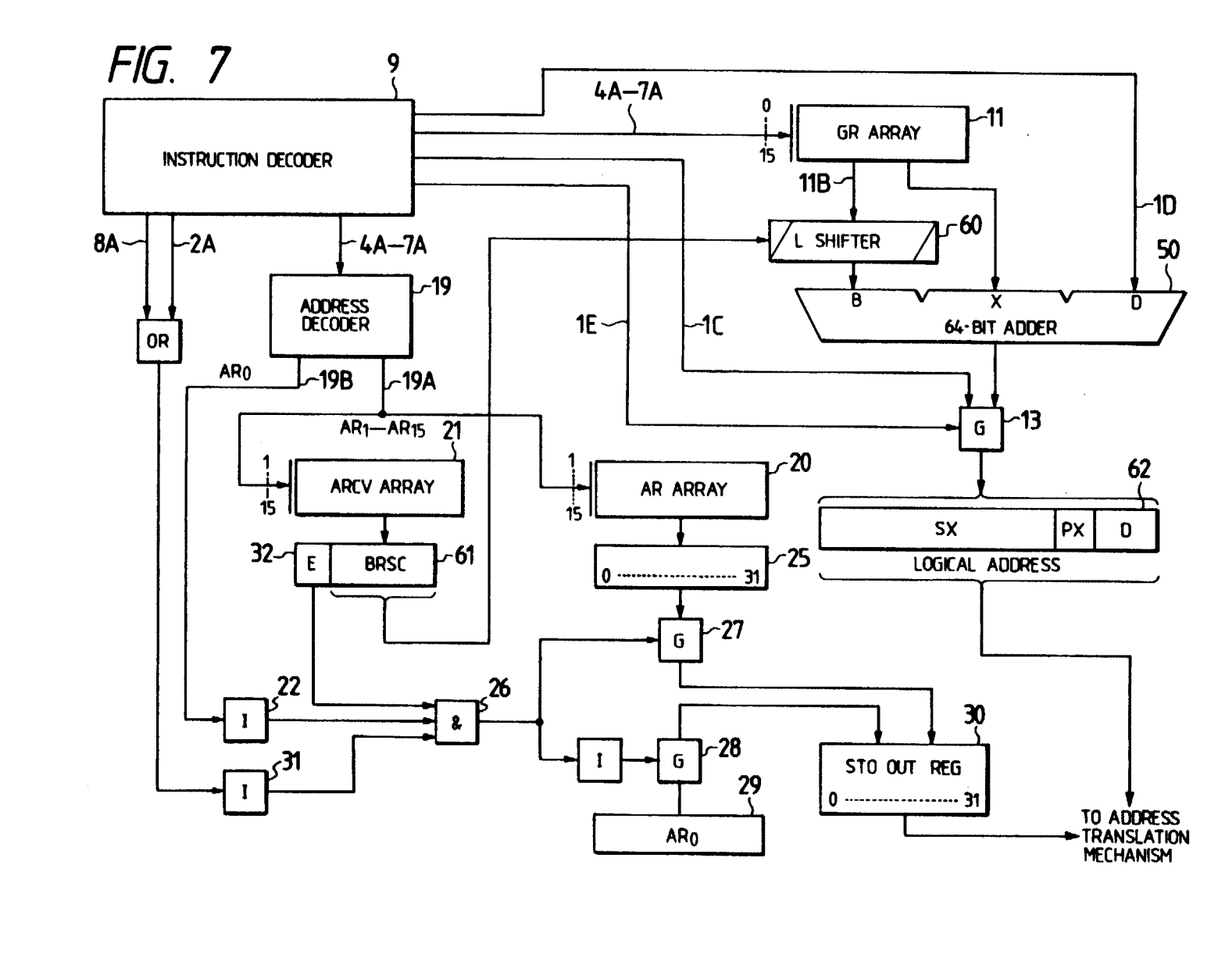
FIG. 7 is a view showing another embodiment of the present invention.

FIG. 7 shows a further embodiment of an address space control apparatus according to the present invention. Instead of switching address spaces, this apparatus expands an address space to implement easy handling of large quantities of data. An output 11B from a GR designated as a BR is applied to the 64-bit-wide address adder 50 via a left-shifter 60. Meanwhile, each ARCVR in the ARCV array 21 contains a base register shift count (BRSC) 61 that specifies the length of the shift to be performed by the left-shifter 60.

When a given GR is selected as a BR, an ARCVR associated with that GR is also selected. The BRSC 61 in that ARCVR controls the left-shifter 60. As a result, the contents of the BR are shifted left by the length specified by the BRSC. The output from the 64-bit address adder 50 forms a 64-bit-long logical address 62. The effective SX in this logical address has been elongated by the length of the leftward shift. Thus it becomes possible to access an address space expanded in accordance with the increased SX length. For example, it may be assumed that a code specifying a 12-bit shift length is set in the BRSC. In such a case, the address space is expanded by 4K words every time the BR contents are incremented by '1'. It eventually becomes possible to access an address space of up to 8T words. As before, the STO is obtained from the AR array 20.

The above-described embodiments have been explained as contrivances that expand the functions of an AR array that supplies different STO's in response to the selection of different BR's. However, the present invention is not limited to this concept alone. The invention can singly support, in place of the AR array, the handling of very large quantities of data that cannot be accomodated by a conventional single address space environment. For example, the AR array 20 in FIGS. 2, 6 and 7 may be replaced with a single AR.

Although the invention has been described with reference to particular embodiments thereof, it should be understood by those skilled in the art that various changes and omissions in the details of the invention may be made within the scope and spirit of the following claims.

What is claimed is:

1. An address space control apparatus in a virtual memory system having a storage means and a plurality of general-purpose register means usable as registers which supply data for address calculation, wherein address information specified by an instruction is used to calculate a logical address in an address space, said logical address being combined with an address space identifier defining the address space for translation into a real address in said storage means, said address space control apparatus comprising:
   a first component information register means for containing first component information for determining an address space, said first component information including an address space identifier;
   a means for reading, in response to designation of a first general-purpose register means as a base register by an instruction, second component information, out of a second general-purpose register means corresponding to said first general-purpose register means, for determining an address space; and
   a means for determining an address space identifier to be combined with a logical address, including an adder means for adding said first and second component information.

2. An address space control apparatus in a virtual memory system having a storage means and a plurality of general-purpose register means usable as registers which supply data for address calculation, wherein address information specified by an instruction is used to calculate a logical address in an address space, said logical address being combined with an address space identifier defining the address space for translation into a real address in said storage means, said address space control apparatus comprising:
   a first component information register means for containing first component information for determining an address space, said first component information including a plurality of address space identifiers contained in a plurality of entries within said first component information register means:
   a means for reading, in response to designation of a first general-purpose register means as a base register by an instruction, second component information, out of a second general-purpose register means corresponding to said first general-purpose register means, for determining an address space; and
   a means for determining, by use of said first and second component information, an address space identifier to be combined with a logical address, including an entry designator register means for containing an entry designator designating one of said plurality of entries, and an adder means for producing an entry selection signal by adding said entry designator and said second component information.

3. An address space control apparatus as defined in claim 2, wherein each of multiple general-purpose register means usable as base registers is provided with an associated corresponding second general-purpose register means, first component information register means, and entry designator register means, said apparatus further comprising a means responsive to designation of a general-purpose register means as a base register by an instruction for selecting the second general-purpose register means, first component information register means and entry designator register means corresponding to said general-purpose register means designated as a base register.

4. An address space control apparatus as defined in claim 2, wherein each of multiple general-purpose register means usable as base registers is provided with an associated corresponding second general-purpose register means and entry designator register means, said apparatus further comprising a means responsive to designation of a general-purpose register means as a base register by an instruction for selecting the second general-purpose register means and entry designator register means corresponding to said general-purpose register means designated as a base register.

5. An address space control apparatus in a virtual memory system having a storage means and a plurality of general-purpose register means usable as registers which supply data for address calculation, wherein address information specified by an instruction is used to calculate a logical address in an address space, said logical address being combined with an address space identifier defining the address space for translation into a read address in said storage means, said address space control apparatus comprising:
   an identifier register means for containing an address space identifier;
   an address adder means which receives as one of its inputs a double-length base address formed by coupling the contents of said identifier register means with the contents of a first general-purpose register means designated as a base register by an instruction, the contents of said identifier register means occupying the high-order part of said double-length base address, and receives as another one of its inputs the contents of a double-length index register means formed by coupling a second general-purpose register means designated as an index register by said instruction with a third general-purpose register means corresponding to said second general-purpose register means;

a means for outputting the low-order half of the output of said address adder means as a logical address; and a means for outputting the high-order half of the output of said address adder means as an address space identifier to be combined with said logical address.

6. An address space control apparatus as defined in claim 5, wherein each of multiple general-purpose register means usable as base registers is provided with an associated corresponding identifier register means, said apparatus further comprising a means responsive to designation of a general-purpose register means as a base register by an instruction for selecting the identifier register means corresponding to said general-purpose register means designated as a base register.

7. An address space control apparatus in a virtual memory system having a storage means and a plurality of general-purpose register means usable as registers which supply data for address calculation, wherein address information specified by an instruction is used to calculate a logical address in an address space, said logical address being combined with an address space identifier defining the address space for translation into a real address in said storage means, said address space control apparatus comprising:

an identifier register means for containing an address space identifier;

a shifter means for shifting towards a higher-order position by a specified length the contents of a general-purpose register means designated by an instruction;

an address adder means receiving as a first input the output of said shifter means; and a shift-length register means for storing information which specifies a length of the shift to be performed by said shifter means.

8. An address space control apparatus as defined in claim 7, wherein each of multiple general-purpose register means usable as base registers is provided with an associated corresponding identifier register means and shift-length register means, said apparatus further comprising a means responsive to designation of a general-purpose register means as a base register by an instruction for selecting the identifier register means and shift-length register means corresponding to said general-purpose register means designated as a base register.

* * * * *